United States Patent

Sheng et al.

[15] 3,670,002

[45] June 13, 1972

[54] OXIDATION OF THIOLS TO THIOLSULFONATES AND SULFONIC ACIDS

[72] Inventors: Ming Nan Sheng, Cherry Hill, N.J.; John G. Zajacek, Strafford, Pa.

[73] Assignee: Atlantic Richfield Company, New York, N.Y.

[22] Filed: Feb. 20, 1970

[21] Appl. No.: 13,180

Related U.S. Application Data

[63] Continuation-in-part of Ser. No. 703,907, Feb. 8, 1968, abandoned.

[52] U.S. Cl. ................. 260/453 R, 260/503, 260/505 R, 260/513 R, 260/608
[51] Int. Cl. ............................................. C07c 143/00
[58] Field of Search ............... 260/453 R, 502.6, 503, 505, 260/513

[56] References Cited

UNITED STATES PATENTS

| | | | |
|---|---|---|---|
| 3,329,708 | 7/1967 | Berger | 260/505 |
| 3,365,480 | 1/1968 | Cobb et al. | 260/453 |
| 2,508,256 | 5/1950 | Harman | 260/502 |
| 3,429,903 | 2/1969 | Larson | 260/429 |
| 3,326,949 | 6/1967 | Larson | 260/429 |
| 2,727,920 | 12/1955 | Johnson et al. | 260/513 |
| 2,505,910 | 5/1950 | Proell et al. | 260/513 |
| 3,153,078 | 10/1964 | Fierce et al. | 260/453 |

OTHER PUBLICATIONS

Cotton; " Molybdenum & Tungsten" (1966) Progress in Inorg. Chem. Vol. 7, pp. 399– 400

Primary Examiner—Lewis Gotts
Assistant Examiner—G. Hollrah
Attorney—Robert R. Cochran and John D. Peterson

[57] ABSTRACT

Method for the oxidation of thiols to produce thiolsulfonates or sulfonic acids using an organic hydroperoxide as the oxidizing agent and a molybdenum-containing catalyst.

10 Claims, No Drawings

OXIDATION OF THIOLS TO THIOLSULFONATES AND SULFONIC ACIDS

CROSS REFERENCE TO RELATED APPLICATIONS

This application is a continuation-in-part of our copending application Ser. No. 703,907 filed Feb. 8, 1968 entitled OXIDATION OF THIOLS, now abandoned.

BACKGROUND OF THE INVENTION

1. Field of the Invention

This invention relates to the oxidation of thiols, in particular, organic mercaptan compounds utilizing a molybdenum-containing catalyst and an organic hydroperoxide as the oxidizing agent to produce thiolsulfonates and sulfonic acids.

2. Prior Art

It is well known that peroxy compounds are excellent oxidizing agents. These compounds include hydrogen peroxide, organic hydroperoxides, organic peroxides and peracids, but these compounds do not react in the same manner with a given organic compound. For example, hydrogen peroxide reacts with alkyl sulfides to give the corresponding sulfoxide and organic hydroperoxides also react with alkyl sulfides to give the sulfoxides. If, however, the alkyl sulfide is reacted with a peracid the sulfone is produced.

It is also known that organic hydroperoxides will oxidize thiols to disulfides but the reaction stops with the disulfide. Hydrogen peroxide, however, will oxidize thiols to the disulfide and then with additional oxidation will convert the disulfide to the thiolsulfonate. These afore-mentioned reactions are shown in the literature and are well known.

A recent U.S. Pat. No. 3,365,480 (1968) to Cobb et al., shows the reaction of particular organic thiols with air or an organic peroxide to produce the disulfide which, in turn, is converted to the thiolsulfonate by the use of hydrogen peroxide or a peracid. The organic hydroperoxides, however, produce only disulfides from organic thiols.

Thus the prior art shows that hydrogen peroxide, organic peroxides and peracids are not equivalent to the alkyl hydroperoxides. It is therefore surprising that in accordance with the instant invention organic hydroperoxides when employed in the presence of molybdenum-containing catalysts can be used to oxidize organic thiols either to the thiolsulfonates or to the sulfonic acids depending upon the mole ratio of hydroperoxide to thiol employed. None of the prior art suggests that organic hydroperoxides can be utilized in this manner to give complete oxidation of the thiol. Heretofore, organic hydroperoxides could only be used to produce the disulfide, but when used in conjunction with the molybdenum-containing catalyst they are actually stronger oxidizing agents than hydrogen peroxide since they can be used to produce the sulfonic acid. Sulfonic acids are produced in accordance with prior art methods only by the use of molecular oxygen and a non-aqueous alkaline medium, see U.S. Pat. No. 3,329,708.

SUMMARY OF THE INVENTION

In accordance with this invention a thiol, i.e., an organic compound having the —SH group is oxidized to a compound having the group

or a compound having the group

i.e., a thiolsulfonate or sulfonic acid, respectively, by reacting the thiol with an organic hydroperoxide in the presence of a molybdenum catalyst.

It is an object of this invention therefore to provide a method for the oxidation of thiols.

It is another object of this invention to provide a method for the oxidation of thiols to thiolsulfonates and sulfonic acids.

It is another object of this invention to provide a method for the oxidation of thiols utilizing an organic hydroperoxide as the oxidizing agent and a molybdenum-containing catalyst.

Other objects of this invention will be apparent from the following description of the preferred embodiments and from the claims.

DESCRIPTION OF THE PREFERRED EMBODIMENTS

The compounds which can be oxidized in accordance with this invention have the formula R — SH, and are termed thiols or, more commonly, mercaptans. The R may be alkyl, aryl, alkaryl, aralkyl, cycloalkyl or these groups wherein one or more hydrogens thereof are substituted by halogens, nitro groups, or other similar groups which are not oxidizable by organic hydroperoxides. If the mercaptan has olefinic unsaturation the double bond will be attacked to produce an epoxide prior to the oxidation of the thiol group.

Examples of the compounds which can be oxidized by the method of this invention include methyl mercaptan, ethyl mercaptan, propyl mercaptan and similar alkyl mercaptans including the higher molecular weight compounds such as dodecyl mercaptans and the like. In general the alkyl mercaptans may contain from one to 20 carbon atoms. Aromatic compounds such as thiophenol (benzenethiol), p-toluenethiol, benzyl mercaptan (alpha-toluenethiol) and the like also can be oxidized in accordance with the method of this invention.

In general, the sulfur of the thiol group can be attached to a straight or branched chain alkyl group, to a phenyl group, to alkyl substituted phenyl groups or to an alkyl group substituted by aromatic rings. The method is particularly suitable for compounds having from one to 20 carbon atoms in the molecule.

The organic hydroperoxides which are utilized as the oxidizing agents in this invention are characterized by having the structure ROOH wherein R may be alkyl, aryl, alkaryl, aralkyl, cycloalkyl and similar radicals which also contain functional groups. Examples of the organic hydroperoxides which can be employed are tertiary butyl hydroperoxide, cumene hydroperoxide, alpha-hydroperoxy diisopropyl ketone, tetralin hydroperoxide, cyclohexene hydroperoxide and para-nitrocumene hydroperoxide. It is to be understood that these are merely typical examples of the various organic hydroperoxides which may be employed. Since the —OOH group is the functional group with respect to oxidation, the nature of the R group is not material and thus any organic hydroperoxide may be employed. In general it is preferred that R has from three to 20 carbon atoms and the most preferred compound is tertiary butyl hydroperoxide.

The catalysts which are utilized in the process of this invention are compounds of molybdenum. These include the oxides, for example molybdenum dioxide, molybdenum sesquioxide, molybdenum trioxide, molybdenum pentoxide, the chlorides, for example, molybdenum pentachloride, the coordinate complexes such as molybdenum hexacarbonyl, the acids and the corresponding salts wherein the molybdenum is contained in the anionic portion of the molecule, for example, and the molybdic acids and the corresponding molybdates.

In addition to these simple compounds the high molecular weight complex heteropoly acids and salts of molybdenum can be utilized. The heteropoly acids are complex inorganic compounds having a molecular weight ranging up to 3,000 or higher and are comprised of a high molecular weight heteropoly anion containing two to 18 hexavalent metal atoms surrounding one or more hetero atoms. These complexes of molybdenum are known as the heteropolymolybdates and an example is sodium-silico-12-molybdate. The hetero atoms in the heteropoly anions are most commonly phosphorus or silica, although arsenic, germanium, tin, titanium, zinc and other elements also are known to function as hetero atoms in the heteropoly complexes.

In addition to the heteropoly compounds which are completely inorganic, the heteropoly acids and salts which are formed by reaction between simple salts and organic acids are also suitable. An example of these are the oxalomolybdates and the like. Other organo-molybdenum compounds may be employed, for example, molybdenyl(VI)acetylacetonate, $MoO_2(C_5B'7O)_{2,2}$ molybdenum (III) acetylacetonate, $Mo(C_5H_7B'2)$, and similar organo-molybdenum compounds.

It has been found that any molybdenum compound is suitable as the catalyst in this reaction since it is the molybdenum which is critical and not the remainder of the compound. Those compounds which are soluble in the reaction medium are somewhat more preferred, although even those compounds considered insoluble or which appear insoluble produce the desired reaction.

The amounts of catalyst required are the conventional catalytic amounts. For example, amounts as low as 0.001 mole of molybdenum per mole of the thiol is sufficient with amounts ranging between 0.005 and 0.05 moles of molybdenum per mole of thiol being preferred. Amounts up to 0.1 moles per mole of thiol or higher may be used but are not required.

The mole ratio of hydroperoxide to thiol must be at least 3:1 to convert the thiol to thiolsulfonate assuming a theoretical quantitative reaction and if the thiol is to be converted to the sulfonic acid a minimum mole ratio of 4:1 is required. In general the mole ratio of hydroperoxide to thiol can range from 3:1 to 6:1. If smaller amounts of hydroperoxide are used the mercaptan is converted only to the disulfide and, accordingly, it is necessary to use a minimum of at least 3 moles of hydroperoxide per mole of mercaptan.

The reaction is carried out in the liquid phase preferably in the presence of a solvent and at the reflux temperature of the solvent-reactant mixture, i.e., temperatures in the range of from about 80° to 100° C. although higher temperatures can be employed, for example, 120° C. provided superatmospheric pressures are employed if this temperature is also above reflux temperature. The reaction is preferably carried out at atmospheric pressure although sub-atmospheric or super-atmospheric pressures can be used. At any temperature above reflux temperature, super-atmospheric pressure is used. Solvents which can be employed advantageously are those boiling in the 80° to 100° C. range, for example, the lower aliphatic alcohols, dioxane and the like.

It has been found that the reaction proceeds stepwise through the formation of the disulfide, the thiolsulfonate and finally to the sulfonic acid. The first step consisting of the formation of the disulfide proceeds very rapidly with any solvent or temperature. The formation of the thiolsulfonate usually requires about 30 minutes reaction time, however, the final step, i.e., the conversion of the thiolsulfonate to the sulfonic acid is much more difficult and, in general requires from 4 to 20 hours or more. Thus, with tertiary butyl alcohol as the solvent and a reflux temperature in the range of from 80° to 85° C. the reaction of thiolsulfonate to sulfonic acid is not complete even after 20 hours of reaction. If, however, dioxane is the solvent and thus the reflux temperature is about 100° C. the reaction is substantially complete in 4 hours.

The following examples are presented to illustrate the invention in greater detail but these should not be construed as limiting.

EXAMPLE I

A series of runs was carried out oxidizing paratoluenethiol in various solvents. The reagents in all of these experiments were 5 grams of para-toluenethiol, 50 ml of the solvent, 0.02 gram of molybdenyl(VI)acetylacetonate as the catalyst, and 12 grams of tertiary butyl hydroperoxide (95 per cent purity) as the oxidizing agent. The reagents were placed in a round bottom flask provided with a reflux condenser, thermometer and a dropping funnel. All the reactions were run by adding the hydroperoxide dropwise over a period of 1 hour to the mercaptan and catalyst in the refluxing solvent. After all the hydroperoxide had been added the reaction was continued for four hours additionally. The sulfonic acid was determined by flash evaporating the solvent, dissolving the residue in ether and extracting the para-toluene sulfonic acid into water. The water layer was analyzed by ultraviolet spectrometry to determine the sulfonic acid concentration. In all of the reactions it was found that the unreacted sulfur compound in the ether layer was the thiolsulfonate, i.e., a compound of the formula

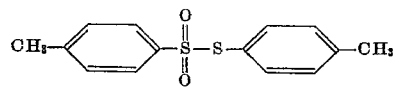

The solvents employed, the reflux temperature and sulfonic acid yield are shown in Table I.

TABLE I

| Solvent | Temp. (°C.) | Sulfonic Acid Yield (%) |
| --- | --- | --- |
| Acetonitrile | 76 | trace |
| nitroethane | 100 | 38 |
| acetic acid | 100 | 33 |
| n-propanol | 92 | 54 |
| t-amyl alcohol | 87 | 33 |
| t-butyl alcohol | 85 | 50 |
| dimethoxyethane | 80 | 44 |
| dioxane | 100 | 68 |

It will be seen from these results that n-propanol and dioxane are the preferred solvents.

EXAMPLE II

The oxidation of para-toluene thiol was carried out stepwise. In the first reaction step the 1 mole of paratoluene thiol was reacted with one-half mole of tertiary butyl hydroperoxide in refluxing (80°–85° C.) tertiary butyl alcohol solvent. In one run of 30 minutes duration no catalyst was employed and the product was found to be the disulfide.

In the second run 0.02 grams of molybdenyl(VI)acetylacetonate catalyst was employed and again the product was the disulfide.

In a third run under the same conditions, i.e., refluxing tertiary butyl alcohol in 30 minutes, 2 moles of the mercaptan and 3 moles of the hydroperoxide were reacted in the absence of catalyst and only the disulfide was obtained. A fourth run was carried out in the same manner as the third run, i.e., refluxing tertiary butanol, 30 minutes reaction time, 2 moles of mercaptan and 3 moles of the hydroperoxide but employing the molybdenyl(VI)acetylacetonate catalyst. Under these conditions the same thiolsulfonate was produced as described in Example I.

Runs were carried out like that of run 4 except that a number of titanium, vanadium, chromium and tungsten compounds were utilized as catalysts in particular acetylacetonates. The only product formed was the disulfide, thus showing that a molybdenum catalyst is unique for the reaction.

EXAMPLE III

An oxidation run was carried out utilizing the thiolsulfonate produced in run 4 of Example II. The mole ratio of thiolsulfonate to tertiary butyl hydroperoxide was 3:1 and in the first run tertiary butyl alcohol was employed as the solvent together with the molybdenyl(VI)acetylacetonate catalyst. Although p-toluene sulfonic acid was produced after 20 hours of reaction there was still unreacted thiolsulfonate present in the reaction medium. When dioxane was employed as the solvent (boiling point 100° C.) instead of the tertiary butyl alcohol under reflux conditions, the other conditions being the same, the thiolsulfonate was oxidized in four hours to the sulfonic acid. When the various other metal compounds utilized in Example II were tried as catalysts it was found that they were ineffective and gave only trace amounts of the sulfonic acid. These runs again demonstrate the unique properties of molybdenum compounds for catalyzing the reaction of this invention.

EXAMPLE IV

Utilizing the same apparatus 10 g. dodecyl mercaptan in 100 ml of tertiary butyl alcohol was added dropwise to a refluxing mixture of 100 ml of tertiary butyl alcohol, 18 g. of tertiary butyl hydroperoxide and 0.05 g. of molybdenum hexacarbonyl as the catalyst. The mole ratio of hydroperoxide to mercaptan was 4:1. A 91 per cent yield of a mixture of the corresponding dodecyl sulfonic acid and thiolsulfonate was obtained.

It has been found that the amount of solvent is not critical but it is preferred to use a sufficient quantity to give a reaction mixture which can be used conveniently when the mercaptan is a solid. When liquid mercaptans are being oxidized it is not critical to employ a solvent, however, in general a solvent is preferred for convenience.

The sulfonic acids produced by the method of this invention have a very wide variety of uses, for example, as the active ingredient in synthetic detergent compositions, as modifiers in built detergent compositions, as fat splitting agents and the like.

We claim:

1. A method of oxidizing organic thiols having the formula R—SH, wherein R is hydrocarbyl alkyl, aryl, alkaryl, aralkyl or cycloalkyl and has from one to 20 carbon atoms which consists essentially of contacting said thiol with an organic hydroperoxide having the formula ROOH, wherein R is hydrocarbyl alkyl, aryl, alkaryl, aralkyl or cycloalkyl and has from three to 20 carbon atoms in the liquid phase in the presence of a solvent selected from the group consisting of hydrocarbyl aliphatic alcohols boiling in the 80° to 100° C. range and dioxane and a catalyst consisting of a molybdenum compound at a temperature of from 80° to 120° C. for at least 4 hours and ranging up to about 20 hours with a mole ratio of hydroperoxide to thiol of at least 3:1 to produce the corresponding thiolsulfonate or sulfonic acid.

2. The method according to claim 1 wherein the solvent is employed with refluxing temperature.

3. The method according to claim 2 wherein the solvent is tertiary butyl alcohol.

4. The method according to claim 2 wherein the solvent is n-propanol.

5. The method according to claim 2 wherein the solvent is dioxane.

6. The method according to claim 1 wherein the mole ratio of hydroperoxide to thiol is in the range of from 3:1 to 6:1.

7. The method according to claim 1 wherein the organic hydroperoxide is tertiary butyl hydroperoxide.

8. The method according to claim 1 wherein the catalyst is molybdenyl(VI)acetylacetonate.

9. The method according to claim 1 wherein the thiol is p-toluenethiol, the organic hydroperoxide is tertiary butyl hydroperoxide, the catalyst is molybdenyl(VI) acetylacetonate and the solvent is dioxane.

10. The method according to claim 1 wherein the thiol is dodecyl mercaptan, the hydroperoxide is tertiary butyl hydroperoxide, the catalyst is molybdenum hexacarbonyl and the solvent is tertiary butyl alcohol.

* * * * *

PO-1050
(5/69)

UNITED STATES PATENT OFFICE
CERTIFICATE OF CORRECTION

Patent No. 3,670,002  Dated June 13, 1972

Inventor(s) Ming Nan Sheng and John G. Zajacek

It is certified that error appears in the above-identified patent and that said Letters Patent are hereby corrected as shown below:

Column 3, lines 7 and 8 should read:

"$MoO_2(C_5H_7O_2)_2$, molybdenum (III) acetylacetonate, $Mo(C_5H_7O_2)_3$, and similar organo-molybdenum compounds."

Instead of:

"$MoO_2(C_5B'7O)_2$,2 molybdenum (III) acetylacetonate, $Mo(C_5H_7B'2),_3$ and similar organo-molybdenum compounds."

Signed and sealed this 21st day of November 1972.

(SEAL)
Attest:

EDWARD M. FLETCHER, JR.
Attesting Officer

ROBERT GOTTSCHALK
Commissioner of Patents